United States Patent
Kim

(10) Patent No.: US 8,390,666 B2
(45) Date of Patent: Mar. 5, 2013

(54) TERMINAL AND CONTROL METHOD THEREOF

(75) Inventor: Sooyoung Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 303 days.

(21) Appl. No.: 12/853,142

(22) Filed: Aug. 9, 2010

(65) Prior Publication Data

US 2011/0058011 A1    Mar. 10, 2011

(30) Foreign Application Priority Data

Sep. 10, 2009   (KR) .................. 10-2009-0085585

(51) Int. Cl.
*H04N 7/14*   (2006.01)

(52) U.S. Cl. ............... 348/14.02; 348/14.01; 348/14.03; 455/556.1

(58) Field of Classification Search ..... 348/14.01–14.16
See application file for complete search history.

(56) References Cited

U.S. PATENT DOCUMENTS

| | | | | |
|---|---|---|---|---|
| 5,253,286 A | * | 10/1993 | Sano et al. ............ | 348/14.01 |
| 5,430,473 A | * | 7/1995 | Beecher et al. ......... | 348/14.05 |
| 2003/0041333 A1 | * | 2/2003 | Allen et al. ............ | 725/106 |
| 2007/0111657 A1 | * | 5/2007 | Yamada et al. ......... | 455/3.01 |
| 2007/0139514 A1 | * | 6/2007 | Marley ................ | 348/14.01 |
| 2009/0059031 A1 | * | 3/2009 | Miyakoshi ............ | 348/222.1 |

* cited by examiner

*Primary Examiner* — Melur Ramakrishnaiah

(74) *Attorney, Agent, or Firm* — Lee, Hong, Degerman, Kang & Waimey

(57) ABSTRACT

A mobile terminal includes: a first controller configured to control a function related to a call; a second controller configured to control a multimedia function such as a camera; and a relay module configured to transfer information required between the first and second controllers, wherein the second controller provides control to continuously capture an image during call communication, and when displaying of the captured image is stopped for the call communication, the controller provides control to display the image by displaying it starting from the point at which the displaying was stopped when the call communication is terminated.

10 Claims, 5 Drawing Sheets

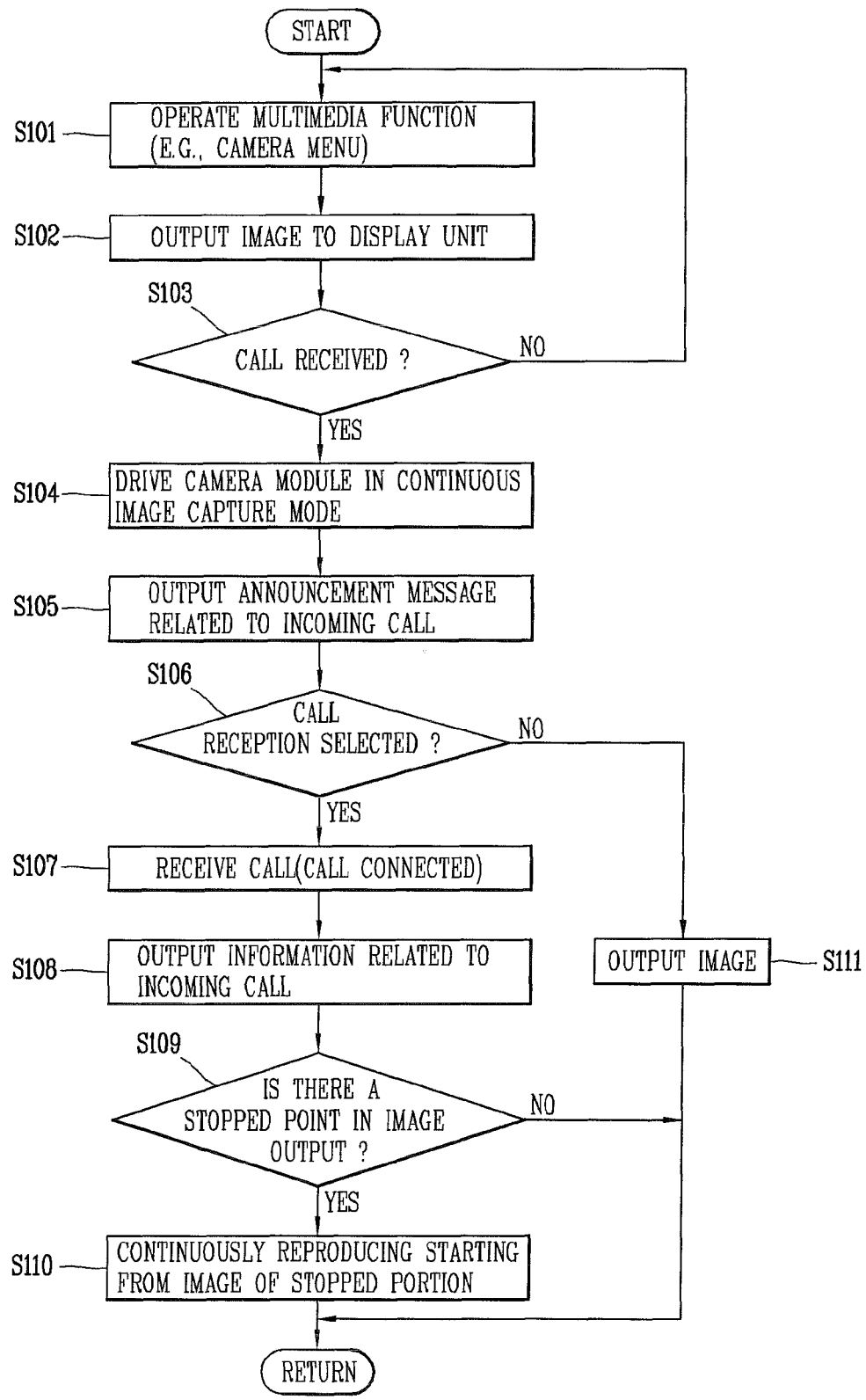

TERMINAL AND CONTROL METHOD THEREOF

CROSS REFERENCE TO RELATED APPLICATIONS

The present application claims the benefit of earlier filing date and right of priority to Korean Application No. 10-2009-0085585 filed in Korea on Sep. 10, 2009, the entire contents of which is hereby incorporated by reference in its entirety.

BACKGROUND OF THE INVENTION

1. Field of the Invention

The present invention relates to a mobile terminal capable of continuously capturing an image during call communication and reproducing the captured image when the call communication is terminated, and its control method.

2. Description of the Related Art

Terminals may be divided into a mobile terminal (portable terminal) and a stationary terminal according to whether the terminal is portable or not. The mobile terminals may be divided into a handheld terminal that can be directly carried around and a vehicle mount terminal.

According to diversification of functions, terminals are implemented in the form of multimedia players having complex functions such as capturing images or video, reproducing music or video files, playing games, receiving broadcasts, etc. In order to support or increase the functions of the terminals, modifications of structural parts and/or software parts of the terminals may be taken into consideration.

In the related art, in order for the user to simultaneously perform call communication while using a multimedia function (e.g., a camera function), the user must stop the multimedia function, connect a video call to a counterpart, and operate the camera (e.g., a video call camera). And then, the user can transmit an image captured by using the camera (e.g., the video call camera) to the counterpart.

In other words, even when the user performs video call communication allowing for a simultaneous execution of image capturing and voice call communication, the user must stop the currently executed camera (e.g., a camera for capturing an image or video) function. Thus, when the camera function is stopped, an image of the situation occurring until such time as the video call is connected and the video call camera is driven cannot be captured. In addition, when a voice call is changed to a video call, an even longer time difference (e.g., the duration in which image capturing by the user is stopped) is made.

SUMMARY OF THE INVENTION

Accordingly, one object of the present invention is to address the above-noted and other problems.

Another object of the present invention is to provide a terminal capable of transmitting a desired image to a counterpart during call communication while multitasking a call communication function and a camera function, and its control method.

Still another object of the present invention is to provide a mobile terminal capable of continuously capturing an image without terminating a camera function in performing a call communication function, and its control method.

Yet another object of the present invention is to provide a mobile terminal capable of continuously capturing an image during call communication to continuously output a preview image starting from a point of the call communication, at which the communication call was stopped, when the preview image outputted during image capturing is temporarily stopped during the call communication, and its control method.

Another object of the present invention is to provide a mobile terminal capable of transmitting images, which have been captured before a call connection, to a counterpart while sequentially reproducing them, starting from a first one, while performing image capturing in real time, and its control method.

Another object of the present invention is to provide a mobile terminal capable of continuously capturing an image without having to terminating a camera function when a voice call is changed to a video call, and its control method.

Another object of the present invention is to provide a mobile terminal capable of simultaneously driving a video call camera and an image capturing camera during video call communication and reproducing or transmitting an image captured by one of the cameras.

To achieve these and other advantages and in accordance with the purpose of the present invention, as embodied and broadly described herein, the present invention provides in one aspect a mobile terminal including: a first controller configured to control a function related to a call; a second controller configured to control a multimedia function such as a camera; and a relay module configured to transfer information required between the first and second controllers, wherein the second controller provides control to continuously capture an image during call communication, and when displaying of the captured image is stopped for the call communication, the controller provides control to display the image by displaying it starting from the point at which the displaying was stopped when the call communication is terminated.

To achieve these and other advantages and in accordance with the purpose of the present invention, as embodied and broadly described herein, when a call is connected while a particular image is being captured, so displaying of the image being captured is stopped for call communication, the image is displayed, starting from the point at which the image was stopped, when the call communication is terminated.

According to exemplary embodiments of the present invention, when the mobile terminal performs the call function, image capturing can continue without terminating a camera function and the image captured by using the photo capturing camera can be transmitted to a counterpart during call communication.

Also, when a voice call is changed to a video call, images, starting from those captured before the call connection, can be sequentially transmitted to the counterpart, while performing image capturing in real time without terminating the camera function.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 2 is a flow chart illustrating the process of a method for controlling a mobile terminal according to an exemplary embodiment of the present invention;

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Figure 1:
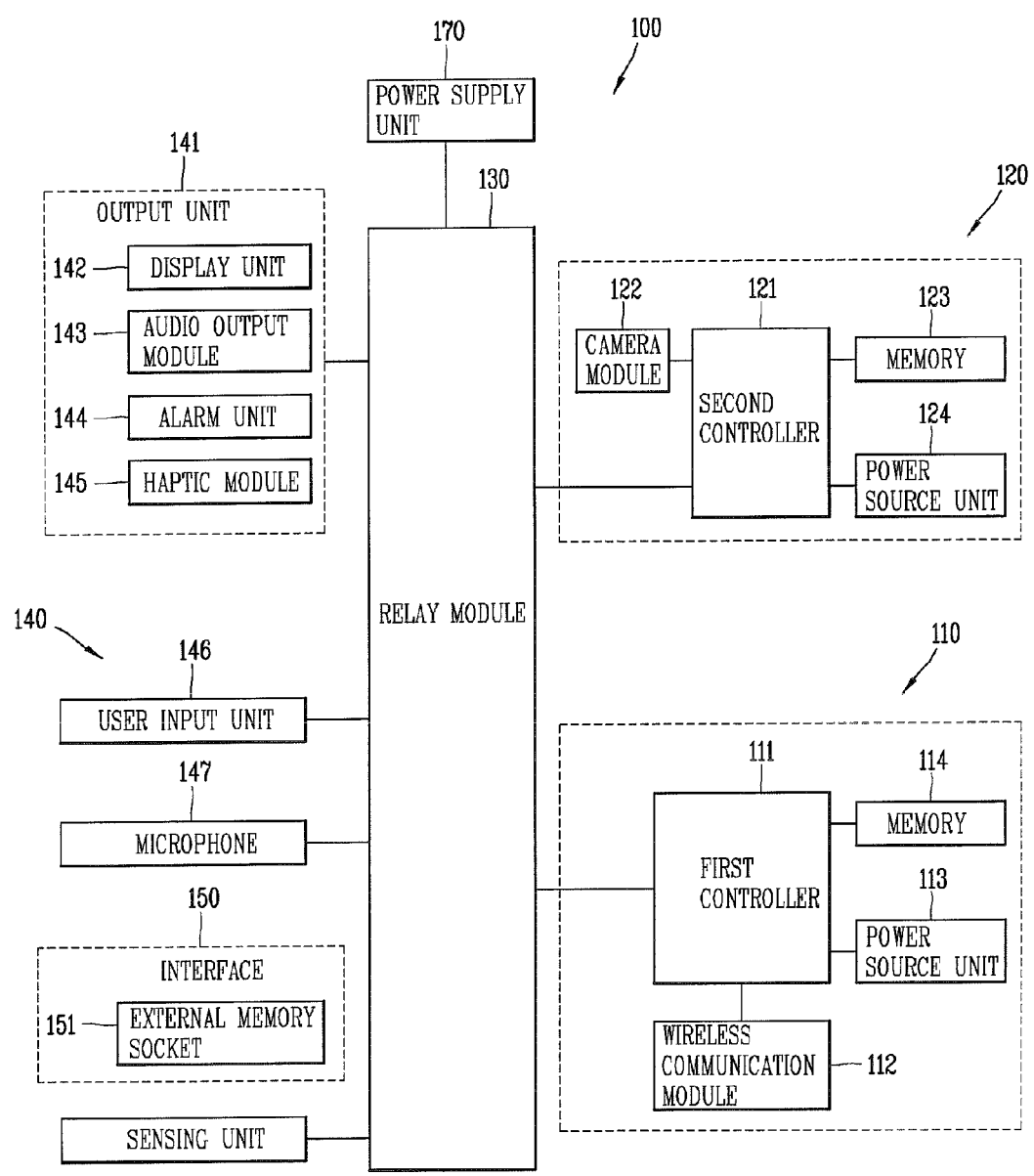
FIG. 1 is a schematic block diagram of a mobile terminal implementing an embodiment of the present invention.

FIG. 1 is a block diagram of mobile terminal 100 in accordance with an embodiment of the present invention.

The mobile terminal 100 may include a communication unit 110, a utility unit 120, a relay module 130, a user interface 140, an interface unit 150, a sensing unit 160, a power supply unit 170, and the like.

The components as shown in FIG. 1 are not a requirement, and greater or fewer components may alternatively be implemented. The utility unit 120 performs functions other than a call communication function. For example, the utility unit 120 may be a camera unit for capturing an image or a unit related to functions such as music reproducing, broadcast viewing, Web browsing, and the like.

In an exemplary embodiment of the present invention, the camera unit will be taken as an example of the utility unit 120 in the following description. In this case, the communication unit 110 and the camera unit 120 may be also called a communication block or an image capturing block in circuitry.

First, the communication unit 110 includes a first controller 111, a wireless communication module 112, a power source unit 113, and a memory 114. The first controller 111 controls the operation of the wireless communication module 112 or the like, and the wireless communication module 112 allows for radio communication between the mobile terminal 100 and a wireless communication system or between the mobile terminal 100 and a network in which the mobile terminal 100 is located.

The wireless communication unit 112 may include a broadcast receiving module, a mobile communication module, a wireless Internet module, a short-range communication module, and a location information module, etc. The first controller 111 may operated in a first mode in which only information can be received, or in a second mode in which transmission is also available. In detail, in the second mode, information can be also received, and other functions, different from information transmission/reception and the functions of the utility unit, for example, functions such as schedule management, screen setting, bell sound setting, and the like, may be additionally implemented.

The power source unit 113 determines whether power supplied from the power supply unit 170 through the relay module 130 is to be provided to the wireless communication module 112 or the like. Information received through the wireless communication module 112, information related to the operation of the first controller 111, or the like, may be stored in the memory 114.

The camera unit 120 may include a second controller 121, a camera module 122, a power source unit 124, and a memory 123. The second controller 121 controls activation or the like of the camera module 122. The second controller 121 independently operates from the first controller 111 of the communication unit 110. The camera module 122 processes image frames such as a still image or video acquired by an image sensor in a video call mode or an image capture mode. The image frames processed by the camera module 122 may be stored in the memory 123 or may be transmitted to the exterior according to an operation of the wireless communication module 112 with the relay module 130 intervening.

The power source unit 124 may activate or deactivate the camera module 122 or the like by power supplied from the power supply unit 170 via the relay module 130. The memory 123 (and a memory 114) may be at least one type of storage medium including a flash memory, a card-type memory (e.g., SD or DX memory, etc), a Random Access Memory (RAM), and an Electrically Erasable Programmable Read-Only Memory (EEPROM). Differently, the function of the memories 114 and 124 may be substituted with a web storage device that performs the storage function over the Internet.

The relay module 130 connects the communication unit 110 and the camera unit 120 by circuitry to allow communication therebetween. When the wireless communication module 112 receives information by the first controller 111 of the communication unit 110 while the camera module 122 is being operated by the second controller 121 of the camera unit 120, a corresponding matter is transferred to the second controller 121 via the relay module 130. When the communication unit 110 and the camera unit 120 operate with different power levels, the relay module 130 may include an adjustment circuit for matching the signals of the different power levels.

The user interface 140 may be operated in association with the communication unit 110 or the camera unit 120 through the relay module 130. The user interface 140 may be controlled by a unit that takes the initiative among the communication unit 110 and the camera unit 120. For example, when the wireless communication module 112 receives information by the first controller 111 of the communication unit 120 while the camera module 122 is being operated by the second controller 121 of the camera unit 120, the user interface 140 outputs the information under the control of the second controller 121, not the first controller 111.

The user interface 140 includes an output unit 141 for generating an output related to sense of sight, acoustic sense, tactile sensation, or the like, a user input unit 146 for receiving information (command or signal) according to a user manipulation, a microphone 147 for receiving a sound, and the like.

The output unit 141 may include a display unit 142, an audio output module 143, an alarm unit 144, a haptic module 145, and the like.

The display unit 142 displays (or outputs) information processed by the mobile terminal 100. The display unit 142 may include at least one of a Liquid Crystal Display (LCD) and a Thin Film Transistor-LCD (TFT-LCD). Some of them may be configured to be transparent to allow viewing of the exterior therethrough, which may be called transparent displays. A typical transparent display may be, for example, a TOLED (Transparent Organic Light Emitting Diode), or the like.

The rear structure of the display unit 142 may include the light transmissive structure. With such a structure, the user can view an object located at a rear side of the terminal body through the region occupied by the display unit 142 of the terminal body. When the display unit 142 and a sensor (referred to as a 'touch sensor', hereinafter) are overlaid in a layered manner (referred to as a 'touch screen', hereinafter), the display unit 142 may be used as both an input device and an output device.

The display unit 142 can display various types of visual information. These units of information may be displayed in the form of characters, numerals, symbols, graphic or icons. To input such information, at least one of the characters, numerals, symbols, graphic and icons are displayed in predetermined arrangement in the form of a keypad. Also, the keypad can be referred to as a 'soft key'.

The audio output module 143 may output audio data received from the wireless communication module 112 or stored in the memories 114 and 123. The audio output module 143 may include a receiver, a speaker, a buzzer, etc.

The alarm unit 144 outputs a signal for informing about an occurrence of an event of the mobile terminal 100. Events generated in the mobile terminal may include call signal reception, message reception, key signal inputs, a touch input etc. In addition to video or audio signals, the alarm unit 144 may output signals in a different manner, for example, to inform about an occurrence of an event. The video or audio signals may be also outputted via the display unit 142 or the audio output module 143, so the display unit 142 and the audio output module 143 may be classified as parts of the alarm unit 144.

A haptic module 145 generates various tactile effects the user may feel. A typical example of the tactile effects generated by the haptic module 154 is vibration. The strength and pattern of the haptic module 145 can be controlled. For example, different vibrations may be combined to be outputted or sequentially outputted. Besides vibration, the haptic module 145 may generate various other tactile effects such as an effect by stimulation such as a pin arrangement vertically moving with respect to a contact skin, a spray force or suction force of air through a jet orifice or a suction opening, a contact on the skin, a contact of an electrode, etc.

The user input unit 146 allows the user to input a command (signal or information) for controlling the operation of an electronic device. The user input unit 146 may include a keypad, a dome switch, a touch pad (e.g., static pressure/capacitance), a jog wheel, a jog switch, etc.

The microphone 147 receives an external audio signal while in a phone call mode, a recording mode, a voice recognition mode, etc., and processes it into electrical audio data. The processed audio data may be converted for output into a format transmittable to a mobile communication base station via the wireless communication module 112 in case of the phone call mode.

The interface unit 150 serves as an interface with every external device connected with the mobile terminal 100. For example, the external devices may transmit data to an external device, receive and transmit power to each element of the mobile terminal 100, or transmit internal data of the mobile terminal 100 to an external device. For example, the interface unit 150 may include wired or wireless headset ports, external power supply ports, wired or wireless data ports, memory card ports, ports for connecting a device having an identification module, audio input/output (I/O) ports, video I/O ports, earphone ports, or the like. The interface unit 150 may include a card socket (151 in FIG. 1) for accommodating an external card.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 150 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The sensing unit 160 detects a current status of the mobile terminal 100 such as an opened or closed state of the mobile terminal 100, a location of the mobile terminal 100, a presence or absence of user contact with the mobile terminal 100, orientation of the mobile terminal 100, an acceleration or deceleration movement of the mobile terminal 100, etc., and generates a sensing signal for controlling the operation of the mobile terminal 100. In addition, the sensing unit 160 can detect whether or not the power supply unit 170 supplies power or whether or not the interface unit 150 is coupled with an external device.

The power supply unit 170 receives external power or internal power and supplies appropriate power required for operating respective elements and components under the control of the relay module 130.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by first and second controllers 111 and 121 by themselves.

The user interface 140, the interface unit 150, and the sensing unit 160 are connected with any one of the communication unit 110 and the camera unit 120 through the relay module 130 and controlled by the relay module 130.

For example, when the display unit 142 outputs a screen image to be captured in association with the second controller 121 of the camera unit 120, the first controller 111 of the communication unit 110 notifies that there is content to be outputted through the display unit 142 via the relay module 130. Upon being notified, the second controller 121 controls the display unit 142 to output the content.

Unlike the memories 114 and 123 independently used by the communication unit 110 and the camera unit 120, an external memory card (not shown) mounted at an external card socket 151 may be configured to be accessed by all of them. For example, image information stored in the external memory card (not shown) by the second controller 121 may be transmitted to the outside by the first controller 111.

A control method that can be implemented by a terminal configured as described above will now be described with reference to the accompanying drawings. The exemplary embodiments of the present invention described hereinafter may be used solely or combined with each other. Also, the exemplary embodiments described hereinafter may be combined with the foregoing UI so as to be used.

In general, in the related art, in order to make a call (e.g., a call origination or a call reception) by using a mobile terminal, the functions executed by the mobile terminal must be terminated. For example, in order to make a call (e.g., a call reception) while a camera function (e.g., video capturing or still image capturing) is in use, the camera mode must be terminated. Namely, in the related art, any other multimedia functions must be suspended or terminated in order to make a call.

In comparison, however, the first controller 111 for controlling a call function and the second controller 121 for controlling a multimedia function are used simultaneously, so that a call can be performed while using the multimedia function (e.g., a camera function). Meanwhile, in the present exemplary embodiment, a controller that takes the initiative will be referred to as a master while a controller that does not have the initiative will be referred to as a slave. In the present exemplary embodiment, the mobile terminal may have a camera (not shown) for performing video call communication at a front side and a camera (not shown) for capturing a still image or video at a rear side. In this case, the camera (not shown) for performing video call communication may be controlled by the first first controller 111.

FIG. 2 is a flow chart illustrating the process of a method for controlling a mobile terminal according to an exemplary embodiment of the present invention.

As shown in FIG. 2, it is assumed that the camera function is in an operational state (S101).

As the camera function is executed, the second controller 121 may capture video or a still image by controlling the camera module 122. In this case, the captured video or still image may be outputted to the display unit 142 (S102).

In the state in which the camera function is operating, when a call is received (S103), the first controller 111 may detect the incoming call. When the incoming call is detected, the first controller 111 may transfer the detected incoming call information to the second controller 121.

For reference, in the mobile terminal including the two controllers according to the present exemplary embodiment, any one of the first controller 111 and the second controller 121 may take the initiative. The initiative may refer to the authority of one of the two controllers for dominantly managing even the functions executed under the control of another. For the sake of explanation, in the present exemplary embodiment, it is assumed that the second controller 121 takes the initiative. However, the present invention is not limited thereto and the first controller 111 may take the initiative or both controllers may be independently operated without taking the initiative.

The second controller 121 which has received incoming call information from the first controller 111 may drive the camera module 122 in a continuous capture mode (S104).

The continuous capture mode refers to a mode in which image capturing can be performed without an interruption although an image being captured is not outputted to the display unit 142. For example, when a call is received, the display unit 142 may stop displaying of an image being captured and display information related to call reception, and in this case, image capturing is being made without a pause. Also, when displaying of the units of information related to the call reception is stopped, the captured image can be automatically displayed continuously, starting from the point at which displaying was stopped. Also, although the information related to the call reception is not displayed, displaying of the image currently being captured (e.g., a preview image) may be stopped during call communication. Also, when the call is terminated, the image being captured may be automatically reproduced and displayed, starting from the point at which the displaying was stopped.

In this case, there may be a time difference between the image being outputted to the display unit 142 and the image being currently captured in real time, by a duration in which displaying of the image being captured was stopped in order to output the call reception information. Also, an image being captured in real time as described above can be reproduced, starting from a particular position, and transmitted to a counterpart during the call communication.

Also, as described above, the second controller 121, which has received the information related to the incoming call, may output an announcement message related to the incoming call (S105). For example, the announcement message may be a message informing the user about the incoming call to allow the user to select whether to receive the incoming call. In this case, the announcement message may be outputted to the display unit 142 via the relay module 130, and the image being outputted presently (e.g., still image or video) may be also outputted together. Here, the incoming call may include a voice call and a video call (VT call).

When the user selects receiving of the incoming call according to the announcement message (S106), the first controller 111 receives the incoming call (S107). If, however, the user selects rejection of receiving the incoming call, the first controller 111 rejects receiving of the incoming call. When the call reception is rejected, the second controller 121 may output one of the image being currently captured and a reproduced image (S111).

The second controller 121, taking the initiative, may output information related to the incoming call while the call is being received (S108).

In this case, the second controller 121 may output both the information related to the received call and the image being captured by the camera module 122 in an overlaid manner. Alternatively, any one of the information related to the received call and the image information being captured may be selectively outputted. Here, even if the image being captured is not outputted to the display unit 142, the image capturing can be continuously executed.

In this case, the units of information being outputted to the display unit 142 may be automatically selected by the second controller 121 according to circumstances. For example, when a video call is performed with the counterpart or when the user manipulates a call origination, the second controller 121 may output only the information related to the video call or the call origination, rather than outputting the image being currently captured. Here, the information related to the call reception may include information registered to a phone book or call time information.

When the image being captured is not outputted, the second controller 121 may store the portion whose outputting was stopped. And then, when the image is being outputted again, if there is a point at which the image outputting was stopped (S109), the second controller 121 may successively output the image, starting from the stopped position (S110).

In other words, the image is continuously being captured in real time, and the captured image may be repeatedly outputted and stopped.

Here, the image being captured may be outputted to the counterpart during the call communication. In this case, however, the image being captured in real time is in a state of not being completed for capturing, so it cannot be transmitted as a file. Namely, the image being captured needs to be transmitted in real time like video call communication. If a desired image among the outputted image is captured as video or as a still image, the captured image may be transmitted in the form of a file. The captured image may be transmitted by using a file transmission service such as an SMS (Short Message Service), an MMS (Multimedia Message Service), and the like.

FIGS. 3a to 3d are views for explaining a method for controlling a camera mode of the mobile terminal according to an exemplary embodiment of the present invention.

Figure 3A:
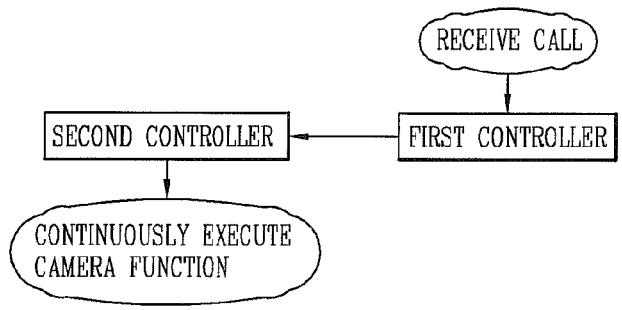
FIGS. 3a to 3d are views for explaining a method for controlling a camera mode of the mobile terminal according to an exemplary embodiment of the present invention.
Figure 3B:
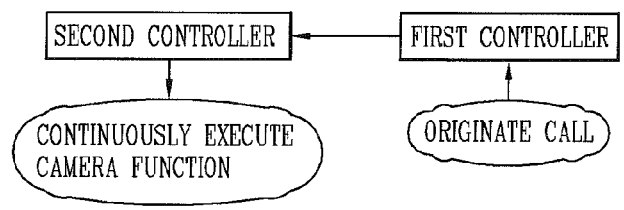
Figure 3C:
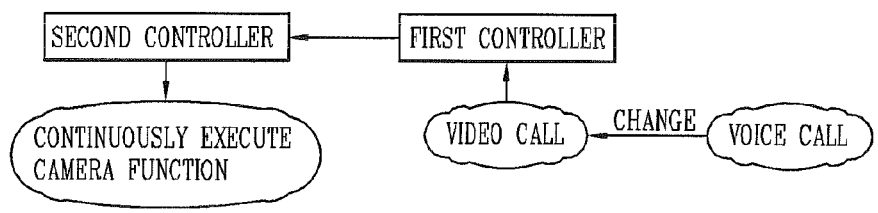

In an exemplary embodiment, when a call function is performed, image capturing can be continued without having to terminate the camera function. For example, as shown In FIG. 3a, even when a call is received, the second controller 121 may not terminate the camera function. As shown in FIG. 3b, when the user originates a call, the second controller 121 may not terminate the camera function. As shown in FIG. 3c, when the user changes a voice call to a video call, the second controller 121 may not terminate the camera function.

Because the camera function is not terminated while the call communication is performed, the user can continuously capture the image of a desired subject while performing call communication. However, in the case of performing call communication, displaying of the image (e.g., a preview image) being currently captured may be stopped, and when the call communication is terminated, the image of the captured image may be successively reproduced, starting from the position at which the displaying was stopped.

Figure 3D:
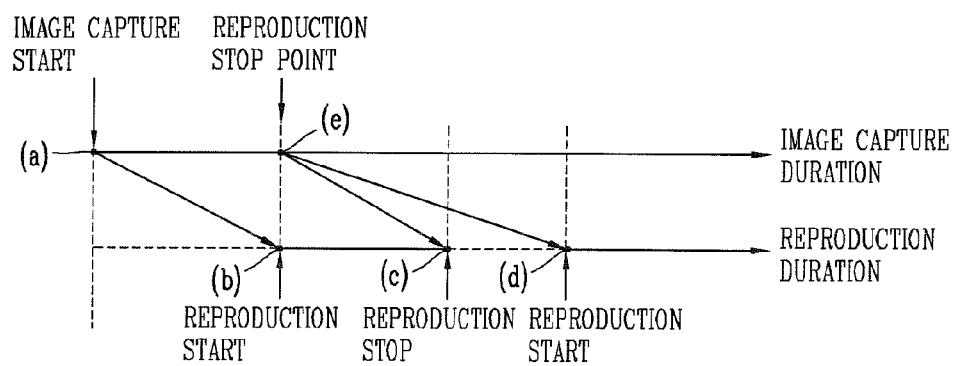

When executing the camera function, the second controller 121 may output the preview image or may not output the preview image according to circumstances. Also, the second controller 121 may simultaneously execute image capturing by the camera and its reproducing. In this case, the image capture point and the reproduction point may be different. For example, as shown in FIG. 3d, image capturing is performed in real time, while a reproduction start time (point 'b') may be later than the image capturing start time (point 'a'). Also, after reproducing is stopped (point 'c'), when reproducing is resumed (point 'd') with the lapse of a certain time, the image can be reproduced continuously starting from the reproduction stop point (point 'e') Also, when the captured image is reproduced, a pre-set particular button may be pressed to capture a desired image. The captured image may be stored as a photo file.

Also, the captured image may be transmitted to a particular counterpart in real time through reproduction, and an image completed for capturing may be transmitted in the units of files by using a file transmission service. The captured still image or video may be deleted according to a user selection.

Figure 4A:
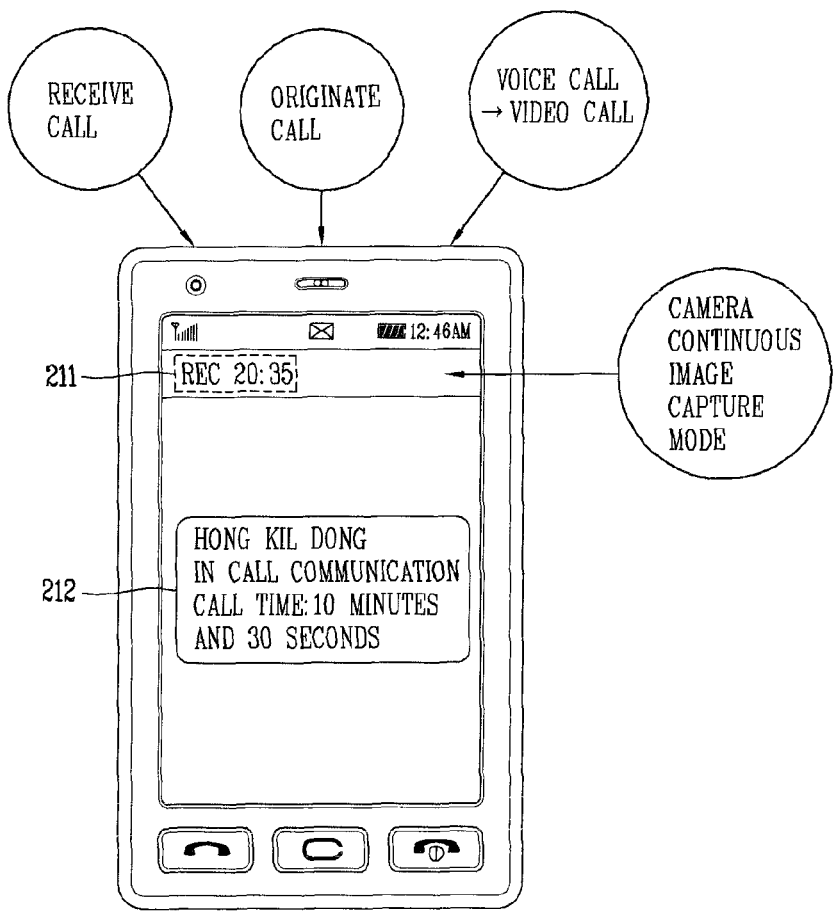
FIGS. 4a and 4b are views for explaining an image capture mode and an image reproduction mode of the mobile terminal according to an exemplary embodiment of the present invention.
Figure 4B:
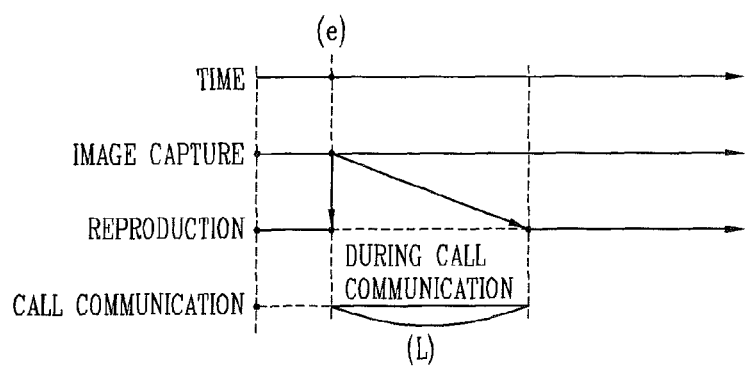

FIGS. 4a and 4b are views for explaining an image capture mode and an image reproduction mode of the mobile terminal according to an exemplary embodiment of the present invention.

As shown in FIG. 4a, when a call is received or when a call is originated, or when a voice call is changed to a video call, the second controller 121 may drive the camera module 122 in a continuous image capture mode. Also, the second controller 121 may output one of units of information related to call reception or call origination or call change, instead of an image outputted from the camera module 122.

In an exemplary embodiment of the present invention, image capturing can be continuously performed by controlling the camera module 122 regardless of whether or not the operation related to call communication is executed or stopped. Namely, the continuous image capture mode refers to a mode in which image capturing can be continued although an image being captured is not outputted to the display unit 142.

The second controller 121 may display both information related to the call and information related to the camera image together. For example, the second controller 121 may display the plurality of units of information in an overlaid manner and divide the screen image to display the information related to the call at one area and the information related to the camera image at another area. When the plurality of units of information are displayed together, a proceeding state of each function (e.g., the call function, the camera capture function, and the like) may be known.

Meanwhile, when the information related to the call is outputted, the second controller 121 may stop displaying of the image being captured by the camera module 122. However, even when the captured image is not displayed, image capturing is being made ceaselessly. When only one operation 212 (e.g., a call operation) among the units of information is displayed, the second controller 121 may display an indicator (e.g., an indicator indicating an image capture state) 211 allowing for a simple recognition of the proceeding state of another operation (e.g., the camera operation).

As shown in FIG. 4b, when only the information related to the call communication is outputted and the information related to the camera capturing is not outputted, the second controller 121 may store the point (point 'e') at which the image of the camera is not outputted. For example, on the assumption that image capturing is executed at 10:00 a.m., when displaying of the image being currently captured is stopped for a call communication at 10:05 a.m., the second controller 121 may store the point (point 'e') of 10:05 a.m. as a position from which reproducing will be resumed Although outputting of the image is stopped, image capturing may be continuously performed. The amount that can be captured between a point at which displaying is stopped and a point at which image capturing is currently performed may vary depending on the capacity of the memory 123 or the memory 114.

Meanwhile, when displaying of the units of information related to the call communication is stopped, the second controller 121 may automatically display the image being captured again. In this case, as for the point at which the image is displayed, the image can be displayed successively, starting from the position at which displaying of the image was stopped (e.g., the point of 10:05 a.m.). Alternatively, the user may directly designate the display point.

In this case, there may be a time difference between the image being outputted to the display unit 142 and the image being currently captured in real time by the duration (e.g., L interval) in which the displaying of the image was stopped to output the units of information related to the call communication.

Figure 5:
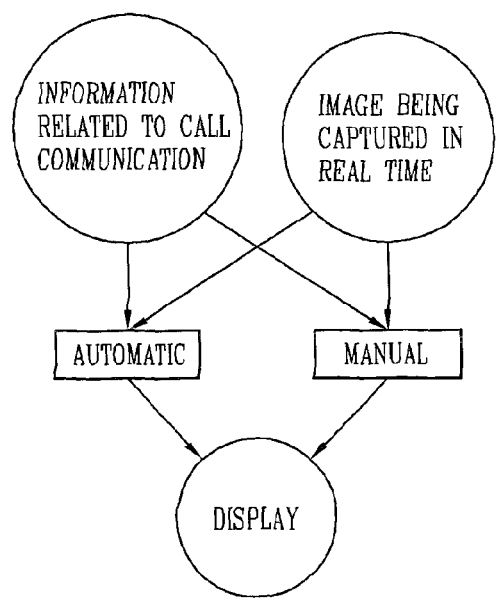
FIG. 5 is a view for explaining a method for outputting an image of the mobile terminal according to an exemplary embodiment of the present invention.

FIG. 5 is a view for explaining a method for outputting an image of the mobile terminal according to an exemplary embodiment of the present invention.

While the user is performing call communication, the second controller 121 may output information related to the counterpart of the call communication. The information related to the counterpart of the call communication may include information registered to a phone book such as a photo image or an image of the counterpart or the name or a phone number of the counterpart.

The second controller 121 may output the information related to the counterpart of the call communication and the image being captured by using the camera module 122 together. Alternatively, the second controller 121 may selectively output one of the information related to the counterpart of the call communication and the image information being currently captured in real time. In this case, even if the image being currently captured is not outputted, the image capturing may be continuously performed.

The second controller 121 may automatically select the units of information outputted to the display unit 142 according to circumstances. The circumstances for selecting the output information may be set as a default. For example, when the user performs call communication with the counterpart or when the user manipulates a call origination, the second controller 121 may output only information related to the call.

Alternatively, the user may input a pre-set particular button to select information to be outputted to the display unit 142. For example, whenever the user presses a pre-set particular button, the information related to the call communication and the captured image may be sequentially outputted or the information related to the call communication and the captured image may be outputted together.

Figure 6:
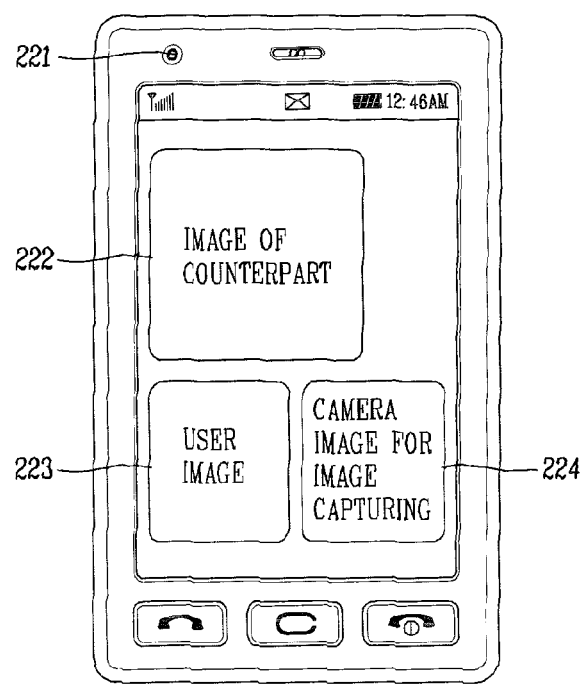
FIG. 6 is a view for explaining a method for transmitting an image of the mobile terminal according to an exemplary embodiment of the present invention.

FIG. 6 is a view for explaining a method for transmitting an image of the mobile terminal according to an exemplary embodiment of the present invention.

In an exemplary embodiment of the present invention, the camera 221 for a video call and the camera (not shown) for capturing an image may be simultaneously driven and the image captured by one camera can be transmitted to the counterpart of the call communication. Here, the camera 221 for a video call may be a camera attached to the front side of the mobile terminal to capture the user during video call communication, and the camera (not shown) for capturing an image may be a camera attached to the rear side of the mobile terminal to capture a still image or video of a subject.

In general, an image 222 of the counterpart and an image 223 of the user himself are outputted to the video call screen. Here, the image 223 of the user himself is an image transmitted in real time to the counterpart, and the image of the counterpart is an image received in real time from the counterpart. The image 223 of the user himself is captured by using the video call camera 221. The image capturing camera (not shown) may be controlled by the second controller 121, while the video call camera 221 may be controlled by the first first controller 111.

In the present exemplary embodiment, one or more images may be further outputted to the image call screen. Namely, in the present exemplary embodiment, an image 224 captured by the image capturing camera (not shown) may be additionally outputted. For example, in the present exemplary embodiment, one of previously captured images or an image being captured in real time through the image capturing camera (not shown) may be outputted.

Also, the image captured by the video capturing camera 221 may be substituted to be transmitted, instead of the image of the user himself captured by the image capturing camera.

Here, the image to be substituted and transmitted to the counterpart may not be an image at a time point at which image capturing is currently performed in real time. For example, an image captured a few minutes before the time at which image capturing is currently performed may be reproduced and transmitted as a substitute image. In other words, an image capture time point of the image being currently captured and a reproduction point may be different. For example, when an image captured at a few minutes before is transmitted, the transmitted image is always ahead of the time at which image capturing is currently performed.

Meanwhile, the second controller 121 may differently set an image capturing speed and an image reproduction speed. For example, assuming that an image capturing speed is one speed rate, an image reproduction speed may be set to be 1.2 speed rate. Accordingly, when an image reproduction time and an image capturing become equal with the lapse of a particular time, the image reproduction speed may be automatically changed to one speed rate, the same as the image capturing speed.

Also, although image capturing is continued, image transmission may be suspended according to the operational situation of the mobile terminal. When image transmission is suspended, the second controller 121 may store the point at which the transmission is suspended. And when the image is desired to be continuously transmitted, the second controller 121 may successively transmit the image, starting from the suspended position.

In the present exemplary embodiment, the image is continuously being captured, the transmission of the captured image and stopping of image transmission may be repeated, and when the image transmission is resumed, the image can be successively transmitted, starting from the position at which the image transmission was stopped.

Also, the user may selectively transmit a particular portion of the image being captured in real time or a previously captured image. The particular portion may be directly selected by the user.

The reason for transmitting the substitute video in real time, rather than transmitting it one time as a file, is because capturing of the image being currently captured in real time is not completed yet, so file generation has not been completed. When files are generated by dividing image in the units of particular time duration while image capturing is continued, the image may be transmitted by the files.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a first controller configured to control a function related to a call;
   a second controller configured to control a multimedia function;
   a display unit configured to display information;
   a camera configured to capture images; and
   a relay module configured to transfer information between the first and second controllers,
   wherein the second controller controls the camera to continuously capture an image during call communication, controls the display unit to pause display of the captured image during the call communication, and controls the display unit to reproduce the captured image from a point at which image display was paused when the call communication is terminated.

2. The mobile terminal of claim 1, wherein the second controller controls the camera to continuously perform image capture during the call communication without a pause although the captured image is not displayed.

3. The mobile terminal of claim 1, wherein the second controller controls the camera to continuously perform image capture when a call is received or originated or a voice call is changed to a video call.

4. The mobile terminal of claim 1, wherein the second controller reproduces a pre-set portion of a previously captured image and transmits the pre-set portion to another party during the call communication when the call is a video call.

5. The mobile terminal of claim 1, wherein an image capture time point and an image reproduction time point are different when capturing and reproducing the image.

6. The mobile terminal of claim 1, wherein an image capture speed and an image reproduction speed are set to be different.

7. The mobile terminal of claim 1, wherein the second controller controls the camera to capture and reproduce a corresponding screen image when a pre-set button is pressed.

8. The mobile terminal of claim 1, wherein the second controller controls the display unit to display either an image of another party that has been received, an image of a user captured by a video call camera or an image captured by an image capturing camera when the call is a video call.

9. The mobile terminal of claim 8, wherein the second controller transmits an image captured by the image capturing camera as a substitute image when the call is a video call.

10. The mobile terminal of claim 1, wherein the second controller automatically reproduces the captured image when pre-set conditions are met starting from a point of the captured image at which image reproduction was stopped.

* * * * *